March 31, 1931. Re. 18,022

W. H. MORGAN, SR

APPARATUS FOR AND METHOD OF EXTRACTING JUICE FROM CANE STALKS

Original Filed Dec. 7, 1925 3 Sheets-Sheet 1

Inventor

W. H. Morgan Sr.

By Seymour & Bright

Attorneys

March 31, 1931. Re. 18,022
W. H. MORGAN, SR
APPARATUS FOR AND METHOD OF EXTRACTING JUICE FROM CANE STALKS
Original Filed Dec. 7, 1923 3 Sheets-Sheet 2
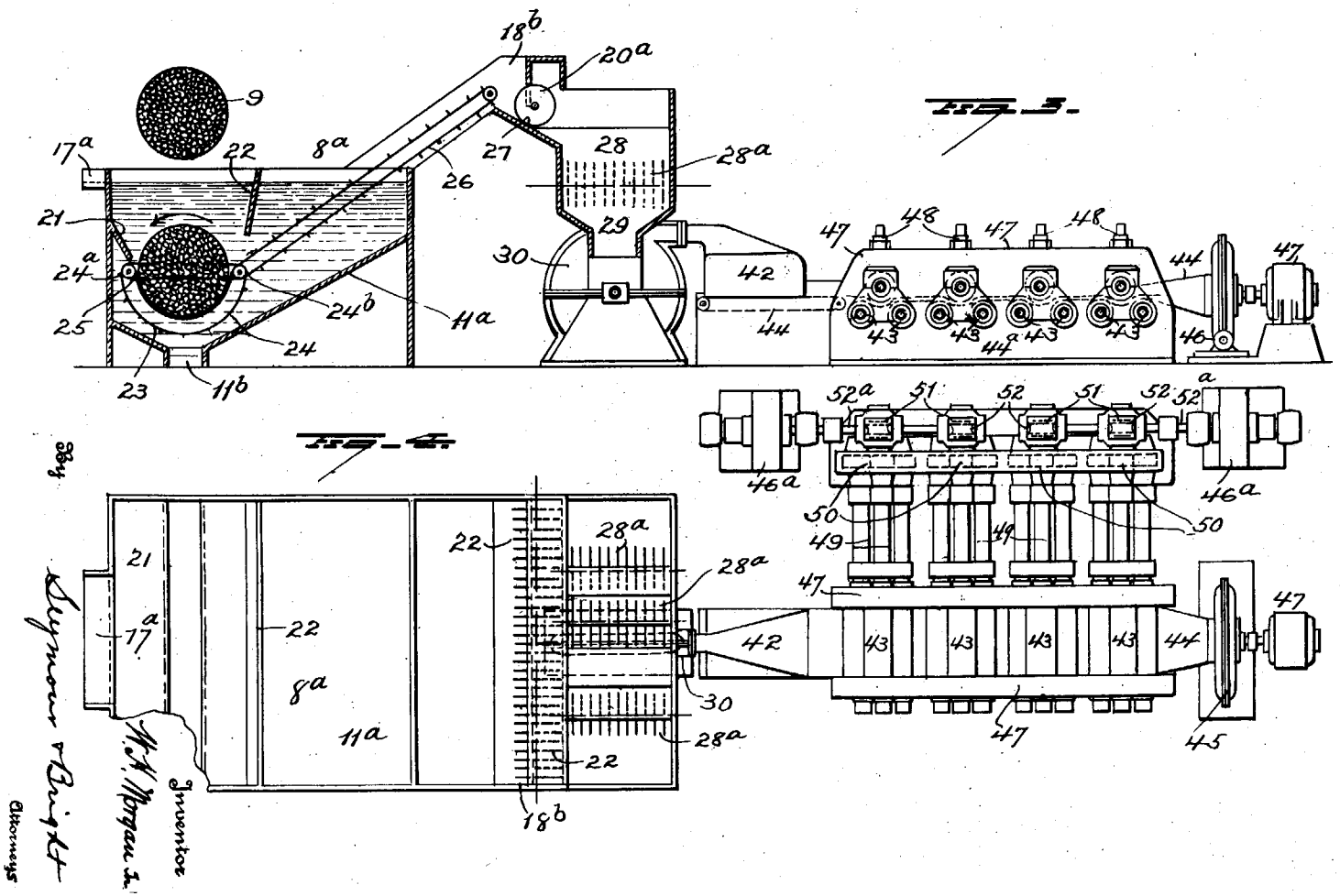
Inventor
W. H. Morgan Sr.
By Seymour & Bright
Attorneys March 31, 1931. Re. 18,022
W. H. MORGAN, SR
APPARATUS FOR AND METHOD OF EXTRACTING JUICE FROM CANE STALKS
Original Filed Dec. 7, 1925 3 Sheets-Sheet 3
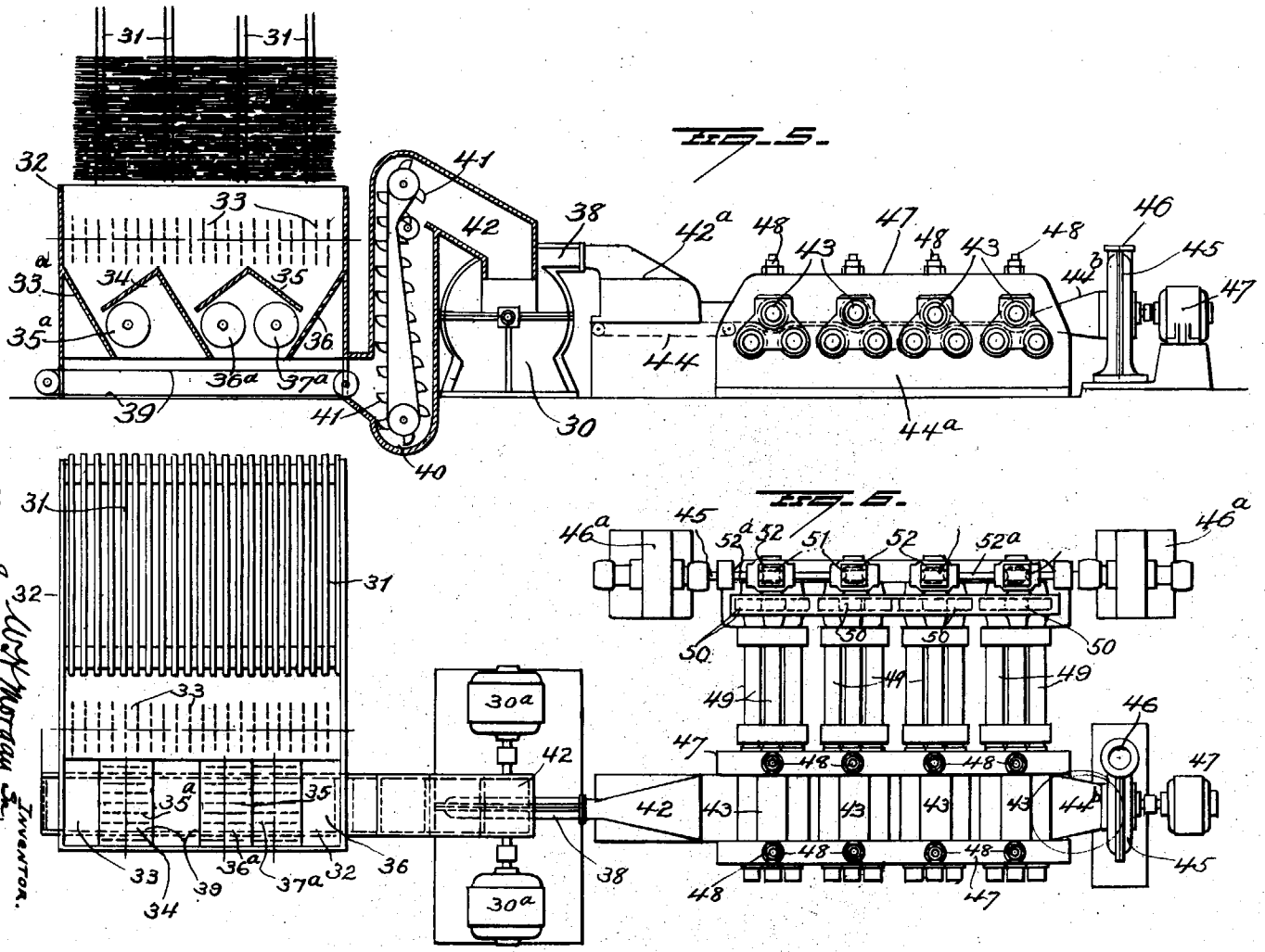
W. H. Morgan Sr. INVENTOR.
By Seymour & Bright Attorneys Reissued Mar. 31, 1931

Re. 18,022

UNITED STATES PATENT OFFICE

WILLIAM H. MORGAN, SR., DECEASED, LATE OF ALLIANCE, OHIO, BY ANNETTE S. MORGAN, EXECUTRIX, OF ALLIANCE, OHIO; SAID WILLIAM H. MORGAN, SR., ASSIGNOR, BY MESNE ASSIGNMENTS, TO MORGAN HURRYCANE COMPANY, OF NEW YORK, N. Y., A CORPORATION OF FLORIDA

APPARATUS FOR AND METHOD OF EXTRACTING JUICE FROM CANE STALKS

Original No. 1,646,762, dated October 25, 1927, Serial No. 73,842, filed December 7, 1925. Application for reissue filed June 15, 1928. Serial No. 285,650.

This invention relates to apparatus for, and method of extracting juice from cane stalks.

The present practice of extracting cane juice, is to first crush the stalks by passing them through slowly revolving crusher rolls, and then passing the crushed stalks through a series of slowly moving juice extracting rolls. The cane as it is fed to the crusher or pre-crusher, is coated with a wax like substance, and carries more or less dirt, leaves and trash and other impurities, which, if it gets into the juice, contaminates the same thus necessitating its purification before it can be converted into sugar.

One object of the invention is to so prepare cane stalks that the juice can be more readily and quickly extracted therefrom.

A further object is to so simplify the apparatus and method that the cane can be harvested and the juice quickly and thoroughly extracted, thus preventing to a great extent inversion, consequently increasing the quantity of sucrose and decreasing the molasses.

A further object is to provide means adapted for cleansing the cane stalks and converting them into a fibrous hay like mass from which the juice may be readily and quickly extracted.

A further object is to provide apparatus that will expedite and simplify the process of extracting the juice from sugar cane at greatly reduced cost of apparatus, operation and time.

With these and other objects in view the invention consists in the apparatus for and the method of treatment of cane stalks respectively embodying and containing the novel and improved features hereinafter described and particularly pointed out in the claims.

The universal method of producing raw sugar as now practiced, is to harvest the cane stalks; conveying them to a mill or central; feed the full length stalks to a pre-crusher, which simply crushes the stalks without cutting them, and passing the crushed stalks to juice extracting rolls or other means for extracting the juice.

The pre-crushing rolls are large heavy slowly rotating rolls, and as the cane is fed thereto in a tangled mass, it is not uniformly distributed throughout the length of the rolls, but may be thicker at either end or the center, consequently the mass of stalks passing through is not uniformly crushed, and as it passes in the same manner to the juice extracting rolls, it is not uniformly pressed, consequently a large percentage of the juice cells are not exposed or ruptured, and the stalks pass from the juice extracting means with a large percentage of the sugar producing content remaining therein which not only results in a heavy loss, but does not dry the bagasse sufficiently for immediate use as a fuel.

Again, the cane is fed to the pre-crusher without cleansing it, hence the dirt and other foreign substances carried in on the stalks, is carried on to the extracting rolls and mixing with the juice, contaminates the same, so that subsequent purification is necessary before the juice can be converted into sugar.

In the accompanying drawings, Figure 1 is a diagrammatic view in side elevation partly in section of one form of apparatus for carrying out the method;

Figure 3 is a view similar to Figure 1 of a modified form of cleansing and cutting apparatus;

Figure 4 is a plan view of the same;

Figures 5 and 6 are similar views of another modified form.

Figure 1:
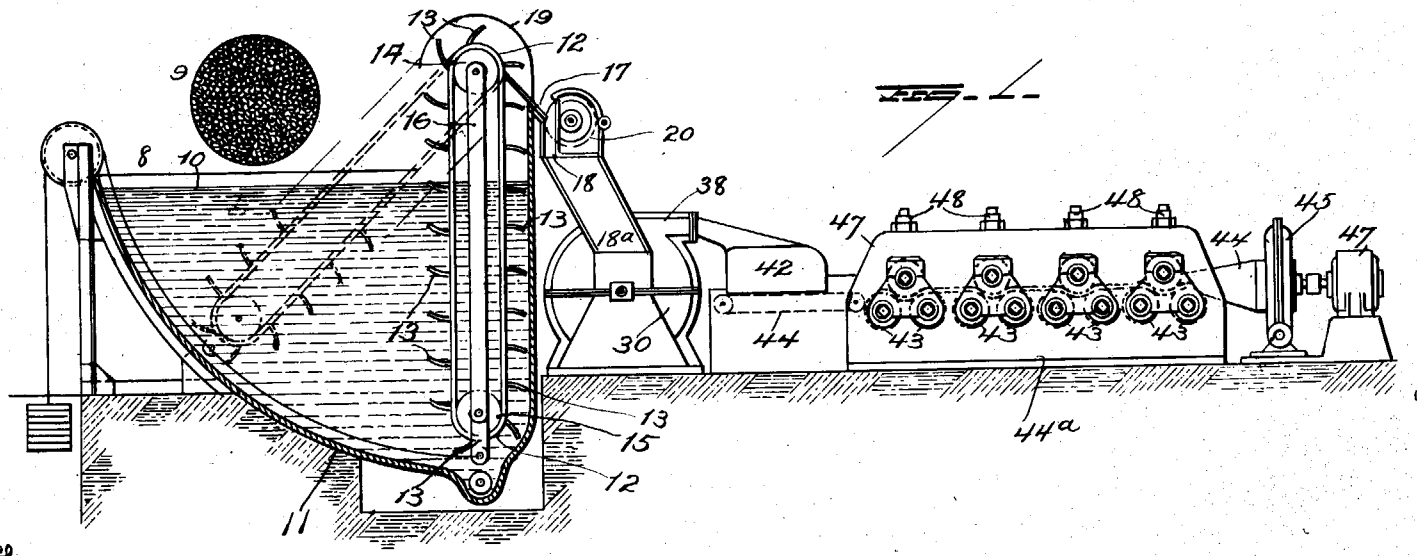
Figure 2:
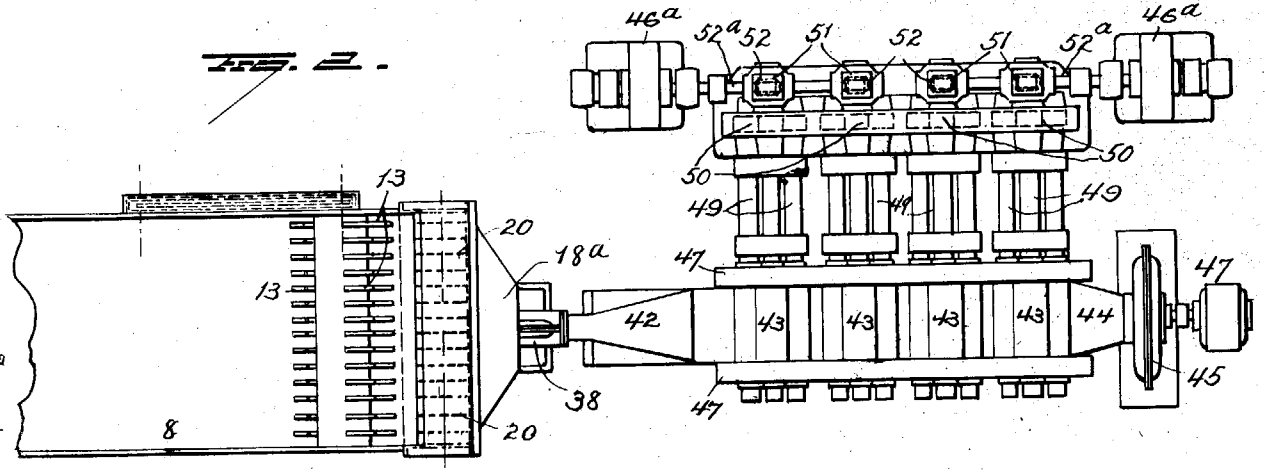
Figure 2 is a view in plan of the same.

In the construction shown in Figures 1 and 2, 8 represents the washing tank or hopper into which the stalks are dumped from a cart, or bundles 9 of stalks deposited by an overhead crane, the water line in the washer being indicated by the numeral 10. This tank or washer is preferably provided with a discharge spout, shown and referred to in a modification to be hereinafter described, through which, leaves, trash and other foreign matter can be discharged or floated out. Most of the cane stalks are sufficiently heavy to sink to the bottom of the tank or other support, while others which are wholly or partly diseased or decayed, are not sufficiently heavy to sink to the bottom of the tank but float near the top. The major part of the cane however, immediately sinks to the bottom of the tank, and gravitates over the inclined bottom 11 toward the endless carrier or elevator 12. This elevator is located adjacent the discharge side of the tank or washer 8, and the stalks are picked up by the curved fingers 13 of the elevator which is mounted at its top on the roller 14, and at its lower end on the roller 15 which latter is carried by the swinging frame 16. This frame 16 is pivoted on the axis of the upper roller 14, or in the plane of said axis, and is adapted to swing forwardly as shown in dotted lines in Figure 1. The bottom 11 of the tank or washer is curved concentric with the axis of the frame 16, so that as the frame is swung forwardly, the teeth 13 on the conveyor will pick up any stalks that may be held in suspension or which do not gravitate to the bottom of the tank. The cane being immersed in water, will be thoroughly washed by the latter and by attrition during its movement in the washer, and is picked up by the fingers 13 of the conveyor and discharged onto the deflector 17 which discharges it into the hopper 18. The upper end of the conveyor or elevator is covered by the housing 19, so that none of the cane carried up by the elevator can drop from the fingers 13, but will be carried up and discharged onto the deflector 17 and slide on the latter to the saws or cutters 20 which are located in the hopper 18. These saws or cutters, a series of which are shown in Figure 2, are at right angles to the length of the stalks and cut the latter into short lengths, and these short lengths or cut stalks fall into the chute 18ª and are fed from the latter to the disintegrator or shearing apparatus which will be referred to later on.

In the constructon shown in Figures 3 and 4, the hopper 8ª as in the previous construction may be located below the floor level, and the cane stalks dumped therein, either from a cart or from a sling carried by an overhead crane, the drain spout for the trash, leaves and other floating particles being shown at 17ª.

This hopper preferably has deflectors 21—22 which direct the cane stalks onto a loop shaped conveyor 23. This conveyor consists of a series of endless and preferably sprocket chains, each of which is provided with a series of fingers 24, which positively move in unison, and consequently rumble the cane stalks in the direction indicated by the arrow. The chains or conveyors 23, are mounted in loop form as shown, and the two shafts 24ª and 24ᵇ carrying the same are connected by a sprocket chain or belt 25, shown in dotted lines in Figure 3, so that they rotate in unison and operate to maintain the conveyor in loop form, or prevent the upper members of the chains from straightening out, which would, or might happen if any undue friction were exerted on the idle shaft 24ª. This hopper is filled with water or other cleansing fluid to the overflow spout 17ª. One of the shafts preferably 24ᵇ is positively driven by a motor, belt or other source of power, and the cane stalks as they fall into the hopper, settle or are directed into the looped conveyor and rotated or turned therein as indicated by the arrow. The immersion of the cane stalks in water, and the rumbling or attrition of the same while thus submerged operate to remove the waxy coating on the stalks and also all sand and dirt adhering to the stalks and allows heavy substances such as stone, tramp metal, etc., to fall through to the bottom of the hopper.

Preferably connected to or mounted on the shaft 24ᵇ is the inclined endless conveyor 26, which is partly submerged in the cleansing fluid, and is so located to receive the stalks carried around on the loop shaped conveyor and carry them up to the hoppers 18ᵇ in open communication with a housing. It will therefore be seen that the stalks in addition to the washing and attrition or rumbling action to which they are subjected while being carried around on the loop shaped conveyor, are also subjected to a washing action of the water or other fluid while being carried up and out of the tank on the conveyor or elevator 26, so that by the time the stalks are discharged from said conveyor or elevator, they have been thoroughly washed and will be substantially free of dirt and other matter which would contaminate the juice.

The bottom 11ª of the tank or hopper 8ª is inclined and is provided at its lowest point with a gutter or well 11ᵇ connected with a pump (not shown) for removing all the dirt washed from the stalks. The conveyors 23 and 26 are preferably composed of chains alternately placed, and the stalks as they are discharged from the conveyor 26 fall onto the deflector 27 from which they gravitate to the saws 20ª which as shown in Figure 3, are located within the hopper 18ᵇ and in a position to engage the stalks as they gravitate down the inclined deflector 27. The axis of these saws is parallel with the axis of the stalks and the saws are at right angles to the latter, so that the saws cut the stalks into short length approximately six inches, and are preferably driven by a motor not shown. The conveyors 23 and 26 may be actuated by a motor (not shown) and belt or chain 25 connecting the shafts 24ª and 24ᵇ operate the conveyors and shafts in unison. If desired the full length stalks may be cleaned in the apparatus above described and then fed to the pre-crusher and juice extracting apparatus now in use. In other words the cleansing features may be added to the apparatus now used, so that cleaned stalks will be fed to the pre-crusher and juice extracting apparatus, and thus dispense with the steps of purifying the juice to remove foreign matter that may go through the mill with the stalks.

In the construction shown in Figures 3 and 4, is provided a second set of saws 28ᵃ located within the hopper 28, the saws being below and in a plane at right angles to the saws 20ᵃ, so as to cut up any stalks that may pass endwise or longitudinally between the saws 20ᵃ, and cut them into short sections, the sections cut by the cutters 20ᵃ falling down and through hopper 28, between the said cutters or saws.

The stalks thus cut into short lengths fall by gravity down the chute 29 which latter, at its top, is as wide as the hopper is long, and this hopper tapers as shown in Figure 3, and feeds the cut stalks to a disintegrator 30, at or near the center thereof which may be as shown in application Serial Number 12,410 filed February 28th, 1925. The movable disk of the disintegrator (not shown) is preferably actuated by the motors 30ᵃ shown in Figure 6 either of which motors may be of sufficient capacity to continue the operation in the event one should fail.

In the operation of said disintegrator shown in application Serial No. 12,410, the cane stalks are subjected to a succession of cutting operations in general directions longitudinally of the stalks to split the stalks repeatedly in the general directions in which the stalk fibers extend. The stalks are thus divided or cut progressively into finer and finer particles, while the longitudinal fibers of the cane are preserved, and finally the stalks are reduced to a fibrous mass containing relatively long fibers. During the disintegrating operation, the cane juice is retained in contact with the solid constituents of the cane and is absorbed in said fibrous mass.

Certain features of the invention may be applied to, or embodied in, a process or apparatus in which the stalks are not passed through a disintegrator, but, after being cut into short lengths by the saws, are fed to the pre-crusher of an ordinary mill.

In the construction shown in Figures 5 and 6, the cane is dumped onto a conveyor 31 located within the water tank 32.

The cut sections of the stalks, and any whole or partially cut stalks which pass endwise up the conveyor and between the saws 33, fall onto one of the deflectors 33ᵃ, 34, 35 and 36 in the water tank, and are guided thereby to one of the saws 35ᵃ, 36ᵃ, 37ᵃ which latter are at right angles to the saw 33, so that any stalks passing endwise between the saws 33, will be engaged by one of the saws 35ᵃ, 36ᵃ or 37ᵃ and be cut into short sections before passing to the disintegrator. Saws 35ᵃ are located below deflector 34 with their peripheries adjacent deflector 33ᵃ. This deflector 34 as well as deflector 35 are V-shaped, and saws 35ᵃ, 36ᵃ and 37ᵃ are located under the said deflectors. It will therefore be seen that part of the stalks cut up by saws 33 and also any long stalks that may pass up between saws 33, will fall on the deflectors and be guided thereby to the lower series of saws, most of the short lengths cut by saws 33 passing between the saws 35ᵃ, 36ᵃ and 37ᵃ while any full lengths or oversize sections will be engaged by one of said latter saws and be cut into shorter lengths.

Saw 35ᵃ engage the stalks discharged on deflectors 33ᵃ and the shorter member of deflector 34; saws 36ᵃ engage the stalks falling on one member of deflector 35 and the longer member of deflector 34, the peripheries of the saws closely approaching the latter, while saws 37ᵃ engage the stalks discharged between the deflectors 35 and 36, the peripheries of the saws being approximately in contact with the longer deflectors. The distintegration, which is designed to shear or shred the cut sections into longitudinal fibrous sections, may be constructed as disclosed in the application above referred to, or it may be of any other construction which will convert the cut sections into longitudinal fibrous, hay like sections, which are discharged therefrom by an air blast or by centrifugal force through the discharge outlet 38.

In the construction shown in Figures 5 and 6 the cut sections, prior to disintegration, fall onto an endless conveyor 39 which discharges them into a trough 40 from which they are picked up by the fingers or buckets on the vertical elevator 41 and discharged from the latter into the chute 42 leading to the disintegrator 30.

The disintegrated stalks are, as before stated, discharged through the spout 38 into the distributor 42ᵃ, which, as shown in Figure 6, is made flaring and considerably reduced in depth, so as to shape the disintegrated stalks into a mat or spongy mass of approximately even thickness, substantially the width of the drying or juice extracting rolls 43. The bottom of the distributor 42ᵃ is open so that the sheared or disintegrated mass falls onto the endless conveyor 44, which latter constitutes the bottom of the distributor, and operates to feed the sheared pulpy mat to the first set 43 of juice extracting or drying rolls. There are four of these sets of rolls shown in the several figures and they are within or over a juice pan 44ᵃ into which the normal juice of the cane falls. The disintegrated mass of stalks is fed from one extracting and drying unit to the next, and by the time it has passed through the last set of drying rolls, approximately all of the normal juice has been extracted and the bagasse is in condition to be fed directly to the boiler furnace to be used as a fuel.

The bagasse, as it leaves the last set of rolls 43, passes into the chute 44[b] to the blower or conveyor 45, and is ejected through the discharge spout 46 thereof, to the furnace or storage bin as the case may be. The blower or conveyor 45 shown is of the centrifugal type and is actuated by the motor 47.

The extracting rolls 43 as shown are preferably mounted in a housing 47, screws 48 being provided for adjusting the upper rolls of the series.

Each roll 43 is coupled to a shaft 49, and the latter are in turn coupled up to shafts each of which carries a gear wheel 50. The gear wheels 50 of each unit are geared up to move in unison, and the shaft of the upper or top gear wheel of each unit, is provided with a worm wheel 51, shown in dotted lines in Figure 2, which meshes with a worm 52 on the drive shaft 52[a]. This drive shaft is shown coupled up to two motors 46[a], either of which is of a capacity sufficient to drive the entire series of drying or juice extracting rolls, so that if either motor gets out of order or needs repairing, the other one will be ample to operate the rolls, or if desired each motor may drive a shaft which operates two juice extracting units.

By shearing or disintegrating the stalks preparatory to the extraction of the juice, much less pressure is required to squeeze or extract the juice from the fibrous mass than is now required by the present method. By the present apparatus the cells are so thoroughly broken up and exposed, that the juice will be expelled therefrom by simply wringing the material, and not solely by a crushing action as now used, which requires a tremendous pressure to separate the juice from the stalks.

The washing and attrition of the cane stalks, rids the stalks of all sand or grit which would otherwise be carried into the disintegrator and injure or dull the shearing blades in same and if passed through the disintegrator would result in an abrasive action on the juice extracting rolls, which would eventually wear them smooth thus preventing the proper gripping action as well as wearing out the bearings, packing etc.

Where a shearing device or disintegrator of any design or construction for cutting or shearing the stalks longitudinally of the same is used, the resultant product is a spongy fibrous mass with the cane juice or sugar content therein. This shearing or disintegrating the stalks ruptures the cells, and while the water will be more or less disposed of by evaporation, the sucrose will, as above stated, remain in the spongy mass.

At the present time the entire crop of sugar cane, must be harvested, the juice extracted, evaporated, etc., within five or six months, the mills being idle the balance of the time. With the present process and apparatus, which is much more rapid than the process and apparatus now in use, one can rapidly or intensively harvest the cane and thus take advantage of the time when there is the greatest percentage of sucrose in the cane, thus greatly decreasing the size and cost of the plants necessary to take care of the entire crop.

After the juice has been removed the bagasse is in perfect shape for burning and can be used as a fuel for supplying power, and is also in condition for making artificial wood, plaster board and similar construction.

Cane thus sheared will yield more sucrose and less glucose, or in other words more crystal sugar and less molasses. It also limits the loss of sucrose in the mud and molasses.

Again in the present process it is not necessary to use filter presses or drying rolls for the bagasse from which the juice has been extracted, as the mud and other foreign matter is extracted before it enters the juice pan, thus eliminating the expense and losses above referred to. This application is a continuation as to common subject matter of the applicant's co-pending application, Serial No. 288, filed January 2, 1925.

Having fully described the invention what is claimed as new and desired to be secured by Letters-Patent, is:—

1. The method of treating sugar cane preparatory to extracting the juice therefrom, consisting in immersing the cane in a vat of cleansing fluid and moving the cane to remove the dirt and other matter adhering thereto, cutting the cane thus cleansed into short lengths and extracting the juice from the cut cane.

2. A method of preparing sugar cane stalks for the extraction of the juice therefrom, comprising conveying the cane stalks to cutters, cutting the stalks into relatively short lengths and feeding the cut stalks into a disintegrator and reducing the cut sections to a disintegrated fibrous mass by repeatedly splitting the same in general directions longitudinally of said sections.

3. A method of preparing sugar cane stalks for the extraction of the juice therefrom, which comprises conveying the stalks to cutters, cutting the stalks into short lengths and automatically feeding the cut sections to a disintegrating apparatus and breaking up the juice cells and reducing the sections to a disintegrated fibrous mass by repeatedly splitting the same in general directions longitudinally thereof and subjecting them to violent impacts.

4. The method of preparing cane stalks for the extraction of the juice therefrom consisting in washing the stalks, automatically feeding the stalks to apparatus for cutting them into short lengths, cutting the stalks into short sections, disintegrating the cut sections and feeding the disintegrated sections to juice extracting apparatus.

5. The method of preparing sugar cane stalks preparatory to the extraction of the juice therefrom, consisting in depositing the stalks in a cleansing fluid, moving the stalks therein to remove the dirt and other foreign substances adhering to the stalks by the action of the cleansing fluid and attrition, feeding the cleansed stalks to apparatus for cutting them into short lengths, cutting the stalks into short sections and disintegrating the cut stalks into a hay like fibrous mass.

6. The method of treating sugar cane stalks preparatory to the extraction of the juice therefrom, consisting in washing the cane stalks within a tank, elevating the stalks within a tank to a point above the fluid in the washing tank, cutting the stalks into short lengths and feeding the cut stalks by gravity to a disintegrator, shearing or shredding the cut stalks into hay like sections with the fibres extending lengthwise the sections and ejecting the sheared stalks to a distributor.

7. In an apparatus for washing and putting sugar cane stalks into a condition for the extraction of the juice therefrom, comprising a hopper or tank into which the cane stalks are deposited, an endless conveyor extending from approximately the bottom of the tank to a point above the fluid line in the latter, cutters located in a position to engage the stalks as they leave the conveyor for cutting the stalks into short lengths, a disintegrator for shredding or shearing the cut stalks and a chute leading from the cutters to the disintegrator.

8. In an apparatus for washing and putting sugar cane stalks into a condition for the ready extraction of the juice therefrom, comprising a hopper or tank into which the cane stalks are deposited and in which they are washed and cleansed by attrition, means for removing the mud and other foreign matter from the tanks, an endless conveyor for elevating the cane stalks to cutters, a series of cutters for cutting the stalks into short lengths, and a shredder or disintegrator into which the cut stalks are automatically fed from the cutters.

9. In an apparatus for washing and preparing sugar cane stalks for the ready extraction of the juice therefrom, comprising a fluid tank having an arc-shaped bottom, an endless conveyor mounted on a frame pivoted to move the lower end of the conveyor over the curved bottom of the tank, the axis of the conveyor frame being substantially coincident with the axis of the curve of the bottom of the tank whereby the conveyor can be moved from its normal vertical position over the curved bottom of the tank.

10. In an apparatus for washing and preparing sugar cane stalks for the extraction of the juice, comprising a fluid tank with an arc-shaped bottom, means at the lowest portion of said bottom for removing foreign matter deposited in the tank with the cane and also for the dirt and other matter adhering to the cane, an endless conveyor, normally located in a substantially vertical position above said lowest portion of the tank bottom the axis of the conveyor being concentric with the curvature of the bottom of the tank whereby the conveyor may be moved to an inclined position, a deflector at the upper end of the conveyor onto which the washed stalks are deposited from the conveyor and a series of cutters adjacent to said deflectors for cutting the stalks into short lengths.

11. In an apparatus for preparing sugar cane stalks for the extraction of the juice, an endless conveyor, a hopper at one end of the conveyor into which the stalks are discharged from the conveyor, cutters to which the stalks are carried by the conveyor for severing the stalks into relatively short lengths, and a disintegrator to receive the cut stalks for repeatedly splitting the cut sections in general directions longitudinally of the same and progressively into finer and finer particles to reduce the sections to a fibrous haylike mass.

12. In an apparatus for preparing sugar cane stalks for the extraction of the juice therefrom, a conveyor for conveying the stalks, cutters to which the stalks are carried by the conveyor for severing the stalks into short lengths, a machine into which the cut stalks are discharged for shearing the stalks into a fibrous haylike mass, and means connecting the shearing machine with a distributor for distributing the sheared stalks into a mat or body of comparatively even thickness.

13. In an apparatus for extracting the juice from cane stalks, a conveyor for the stalks, cutters to which the stalks are carried by the conveyor for cutting the stalks into short lengths, a shearing apparatus into which the cut stalks are discharged for shearing the cut stalks in general directions longitudinally thereof into a fibrous mass, and juice-extracting rolls to which said fibrous mass is delivered for extracting the juice from said fibrous mass.

14. In an apparatus for extracting the juice from cane stalks, an elevator, cutters to which the stalks are carried by said elevator for cutting the stalks into relatively short lengths, a shearing device to which the cut stalks are delivered for shearing the cut stalks into a fibrous haylike mass, a distributor onto which the fibrous mass is discharged from the shearing machine, and juice-extracting rolls to which the sheared mass of stalks is fed from the distributor and evener.

15. In an apparatus for extracting the juice from cane stalks, a conveyor for the stalks, a disintegrating apparatus arranged to receive the stalks from the conveyor for repeatedly splitting the cut stalks in general directions longitudinally thereof and progressively into finer and finer particles to reduce them to a fibrous mass, and juice-extracting means to which the fibrous mass is delivered for extracting the juice from said fibrous mass.

16. The method of treating sugar cane which comprises cutting the cane into relatively short lengths, shearing the cut cane in general directions longitudinally thereof into a fibrous haylike mass, and expressing the juice from said mass.

17. The method of treating sugar cane which comprises cutting the cane into relatively short lengths, splitting said short lengths of cane in general directions longitudinally of the fibers to reduce them to a fibrous haylike mass, and extracting the juice from said mass.

18. The method of treating sugar cane which comprises splitting the cane repeatedly in general directions longitudinally of the same and progressively into finer and finer particles to reduce the cane to a fibrous haylike mass, and extracting the juice from said mass.

19. The method of treating sugar cane which comprises shearing the cane lengthwise repeatedly to reduce the same to a fibrous haylike mass, arranging the disintegrated cane in a mat of substantially uniform thickness, and expressing the juice from said mat.

20. A process of treating sugar cane stalks which comprises subjecting the cane stalks to a succession of cutting operations in general directions longitudinally of the stalks to reduce the same to a loose long-fibered mass and retaining the juice in contact with the solid constituents of the cane during the disintegrating operation to cause the absorption of the juice in said mass and extracting the juice from said mass.

21. A process of treating sugar cane stalks which includes as a step the reduction of the stalks to a loose long-fibered mass and the breaking up of the juice cells by splitting the stalks in general directions of the lengths of the fibers of the stalks.

22. A process of treating sugar cane stalks which includes as a step the reduction of the stalks to a loose long-fibered mass and the breaking up of the greater part of the juice cells by dividing the stalks repeatedly in general directions longitudinally thereof.

23. The process of treating sugar cane stalks which comprises subjecting the stalks to successive cutting operations in general directions longitudinally of the stalks to reduce the same progressively into finer and finer particles and to produce finally a loose long-fibered mass and extracting the juice from said mass.

24. A process of treating cane stalks which comprises reducing the stalks to a loose fibrous mass by splitting the stalks in general directions longitudinally thereof.

25. A process of treating cane stalks which comprises splitting the cane in general directions longitudinally of the stalks to reduce the same to a loose fibrous mass, collecting together substantially all the elements of the disintegrated cane and extracting the juice from the same.

26. A process of disintegrating cane stalks which comprises shearing the cane in general directions longitudinally of the stalks to reduce the same to a loose long fibered mass and extracting the juice from said mass.

27. A method of extracting juice from sugar cane consisting in washing the stalks, shredding or shearing the cut stalks longitudinally into a hay-like fibrous mass, and subjecting the disintegrated mass to juice extracting means.

Signed at Alliance, in the county of Stark and State of Ohio this 4th day of June, 1928.

ANNETTE S. MORGAN,
*Executrix of William H. Morgan, Sr. Deceased.*